ed States Patent

(12) United States Patent
Ichikawa

(10) Patent No.: US 10,482,190 B2
(45) Date of Patent: Nov. 19, 2019

(54) TOPOGRAPHY SIMULATION APPARATUS, TOPOGRAPHY SIMULATION METHOD, AND TOPOGRAPHY SIMULATION PROGRAM

(71) Applicant: TOSHIBA MEMORY CORPORATION, Minato-ku, Tokyo (JP)

(72) Inventor: Takashi Ichikawa, Saitama (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 246 days.

(21) Appl. No.: 15/254,077

(22) Filed: Sep. 1, 2016

(65) Prior Publication Data
US 2017/0262553 A1 Sep. 14, 2017

(30) Foreign Application Priority Data

Mar. 10, 2016 (JP) ................. 2016-047310

(51) Int. Cl.
*G06F 17/50* (2006.01)
(52) U.S. Cl.
CPC .......... *G06F 17/50* (2013.01); *G06F 2217/16* (2013.01)
(58) Field of Classification Search
None
See application file for complete search history.

(56) References Cited

U.S. PATENT DOCUMENTS 6,009,255 A * 12/1999 Shinzawa ........... G06F 17/5018
703/2
8,171,434 B2 5/2012 Iyanagi
(Continued)

FOREIGN PATENT DOCUMENTS

| JP | 04-216646 A | 8/1992 |
| JP | 2002-050553 A | 2/2002 |
| JP | 2014-090083 A | 5/2014 |

OTHER PUBLICATIONS

Kokkoris et al.: "Simulation of SiO2 and Si feature etching for microelectronics and microelectromechanical systems fabrication: A Combined Simulator Coupling Modules of Surface Etching, Local Flux Calculation, and Profile Evolution", J. Vac. Sci. Technol. A 22(4), Jul./Aug. 2004, pp. 1896-1902.

*Primary Examiner* — Craig C Dorais
(74) *Attorney, Agent, or Firm* — Foley & Lardner LLP

(57) ABSTRACT

A topography simulation apparatus includes a processor and a memory connected to the processor. The memory stores instructions executable by the processor to set topographies of a material at N times $T_1$ to $T_N$ (N is an integer of two or more) within a calculation region. The memory further stores instructions executable by the processor to develop the topographies of the material at the times $T_1$ to $T_N$ over time independently, calculate first to N-th values respectively representing a change in a topography of the material from the times $T_1$ to $T_N$ to times $T_1'$ to $T_N'$, and calculate a topography of the material at time $T_{N+1}$, based on the first to N-th values.

20 Claims, 8 Drawing Sheets

(56) References Cited

U.S. PATENT DOCUMENTS 9,189,577 B2 * 11/2015 Kuboi ................. G06F 17/5009
2009/0048813 A1 * 2/2009 Ichikawa ............ G06F 17/5018
703/2

* cited by examiner

TOPOGRAPHY SIMULATION APPARATUS, TOPOGRAPHY SIMULATION METHOD, AND TOPOGRAPHY SIMULATION PROGRAM

CROSS-REFERENCE TO RELATED APPLICATION

This application claims the benefit of and priority to Japanese Patent Application No. 2016-047310, filed Mar. 10, 2016, the entire contents of which are incorporated herein by reference.

FIELD

Embodiments described herein relate generally to a topography simulation apparatus, a topography simulation method, and a topography simulation program.

BACKGROUND

When processing a material by chemical vapor deposition (CVD), reactive ion etching (RIE), or the like, topography simulation for calculating a change (e.g., development over time) in the topography of the material can be performed in advance. In the topography simulation, long calculation time may be taken to process a plurality of surface segments constituting a surface of the material or to precisely predict the final topography of the material. Improvements in such topography simulation remain desired.

SUMMARY

In some embodiments according to one aspect, a topography simulation apparatus may include a processor and a memory connected to the processor. The memory may store instructions executable by the processor to set topographies of a material at N times $T_1$ to $T_N$ within a calculation region, N being an integer of two or more. The memory may store further instructions executable by the processor to develop the topographies of the material at the times $T_1$ to $T_N$ over time independently, calculate first to N-th values respectively representing a change in topography of the material from the times $T_1$ to $T_N$ to times $T_1'$ to $T_N'$, and calculate a topography of the material at time $T_{N+1}$, based on the first to N-th values.

In some embodiments according to another aspect, a non-transitory computer-readable storage medium may store instructions as a topography simulation program executable by a processor to set topographies of a material at N times $T_1$ to $T_N$ within a calculation region, N being an integer of two or more. The non-transitory computer-readable storage medium may store further instructions executable by the processor to develop the topographies of the material at the times $T_1$ to $T_N$ over time independently, and calculate first to N-th values respectively representing a change in topography of the material from the times $T_1$ to $T_N$ to times $T_1'$ to $T_N'$, and calculate a topography of the material at time $T_{N+1}$, based on the first to N-th values.

In some embodiments according to still another aspect, a topography simulation method including setting topographies of a material at N times $T_1$ to $T_N$ within a calculation region. N is an integer of two or more. The topographies of the material may be developed at the times $T_1$ to $T_N$ over time independently. First to N-th surface movement amounts of the material may be calculated from the times $T_1$ to $T_N$ to times $T_1'$ to $T_N'$, respectively. A topography of the material may be calculated at time $T_{N+1}$, based on the first to N-th surface movement amounts.

Other aspects and embodiments of the disclosure are also encompassed. The foregoing summary and the following detailed description are not meant to restrict the disclosure to any particular embodiment but are merely meant to describe some embodiments of the disclosure.

DETAILED DESCRIPTION

When processing a material by chemical vapor deposition (CVD), reactive ion etching (RIE), or the like, topography simulation for calculating a change (e.g., development over time) in the topography of the material can be performed in advance. In the topography simulation, for example, the surface of the material is divided into a plurality of surface segments, and the flux of a particle reaching each surface segment and the movement speed of the local surface of the material are calculated. However, long calculation time may be taken to calculate the flux and the surface movement speed for all of the surfaces without contradiction. That is because the calculation time is increased in the order of the square of the number of surface segments.

Further, when a material is processed into a complex topography with a high aspect, with the miniaturization of a semiconductor device, there is an increased demand to apply topography simulation. In this case, it is considered to predict the final topography of a material by two-dimensional topography simulation. However, there is a problem that a precise final topography is often not obtained in the two-dimensional topography simulation. Meanwhile, if the final topography of a material is predicted by three-dimensional topography simulation, calculation time takes longer.

According to some embodiments, provided are a topography simulation apparatus, a topography simulation method, and a topography simulation program, in which simplification and accuracy improvement of the topography simulation are possible.

In some embodiments, a topography simulation apparatus includes a topography setting unit that sets topographies (or shapes) of a material at N times $T_1$ to $T_N$ (N is an integer of two or more) within a calculation region. In some embodiments, the apparatus further includes a time development calculation unit that develops the topographies of the material at the times $T_1$ to $T_N$ over time independently. In some embodiments, the time development calculation unit calculates first to N-th values respectively representing a change in a topography of the material from the times $T_1$ to $T_N$ to times $T_1'$ to $T_N'$. In some embodiments, the apparatus further includes a topography calculation unit that calculates a topography of the material at time $T_{N+1}$, based on the first to N-th values.

Hereinafter, some embodiments will be described with reference to the drawings.

Figure 1:
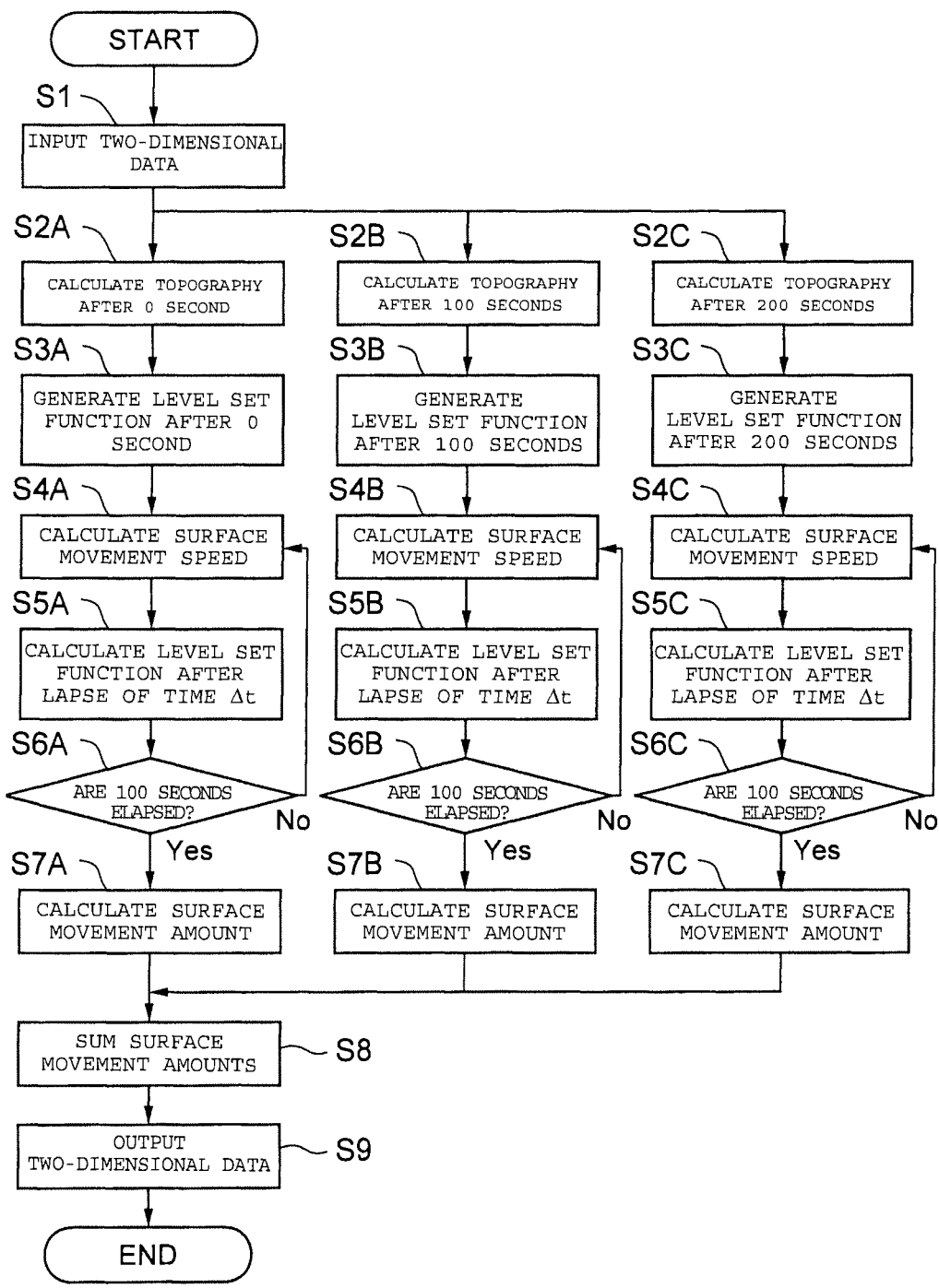
FIG. 1 is a flowchart illustrating a topography simulation method of some embodiments.

FIG. 1 is a flowchart illustrating a topography simulation method of some embodiments. In some embodiments, the topography simulation method is performed using an information processing apparatus such as a personal computer or a work station (see FIG. 14 and FIG. 15). Below, the flow chart in FIG. 1 will be described with reference to FIG. 2 to FIG. 9C.

First, two-dimensional data for setting the initial structure of a material is input to the information processing apparatus (step S1). An example of the two-dimensional data is a Graphic Data System (GDS) format data indicating a layout of a pattern of a photomask for processing a material.

Figure 2:
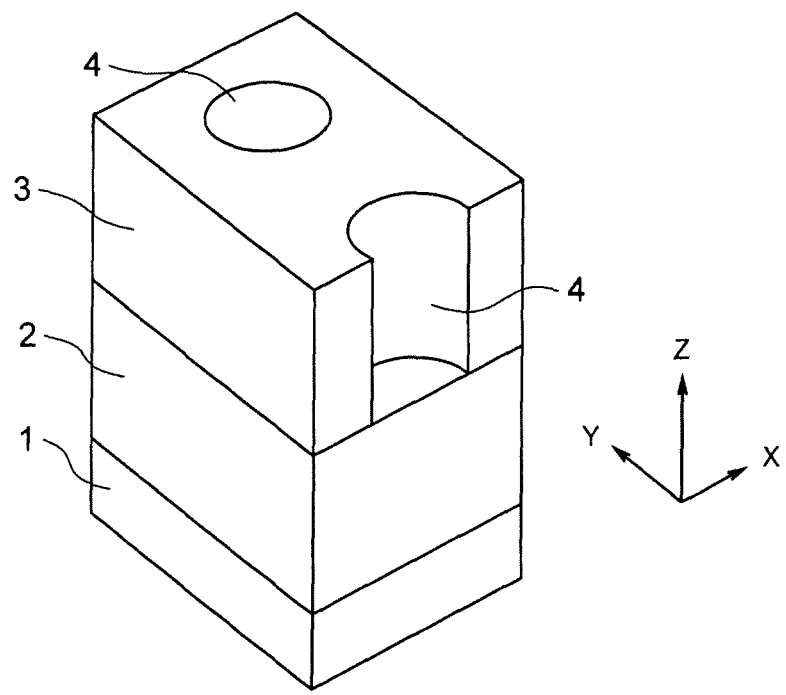
FIG. 2 is a perspective view illustrating an example of an initial structure of a material in some embodiments.

FIG. 2 is a perspective view illustrating an example of an initial structure of a material in some embodiments.

The initial structure illustrated in FIG. 2 includes a substrate 1, a first layer 2 to be processed formed on the substrate 1, a second layer 3 to be processed formed on the first layer 2 to be processed, and an opening 4 formed in the second layer 3 to be processed. An example of the substrate 1 is a silicon substrate. An example of the first layer 2 to be processed is a stacked film alternately including a plurality of silicon oxide films and a plurality of silicon nitride films. Examples of the second layer 3 to be processed are a silicon oxide film, a silicon nitride film, a carbon film, and the like. The opening 4 is formed, for example, by forming a resist layer (not shown) on the second layer 3 to be processed, forming an opening in the resist layer, and transferring the opening of the resist layer to the second layer 3 to be processed (e.g., by lithography—by selective exposure of the second layer 3 to a radiation source such as light).

FIG. 2 represents an X direction and a Y direction, which are parallel with the surface of the substrate 1 and are perpendicular to each other, and a Z direction which is perpendicular to the surface of the substrate 1. In the present disclosure, +Z direction is handled as an upward direction, and −Z direction is handled as a downward direction. The −Z direction of some embodiments may be consistent with the direction of gravity, or may not be coincide with the direction of gravity. By perpendicular or orthogonal, the terms can refer to precisely 90° as well as a range of variation of less than or equal to ±5° relative to 90°, such as less than or equal to ±4°, less than or equal to ±3°, less than or equal to ±2°, or less than or equal to ±1°. In the description of some embodiments, an element provided "on" another element can encompass cases where the former element is directly on (e.g., in physical contact with) the latter element, as well as cases where one or more intervening elements are located between the former element and the latter element. In the description of some embodiments, an element provided "beneath" another element can encompass cases where the former element is directly beneath (e.g., in physical contact with) the latter element, as well as cases where one or more intervening elements are located between the former element and the latter element.

Figure 3:
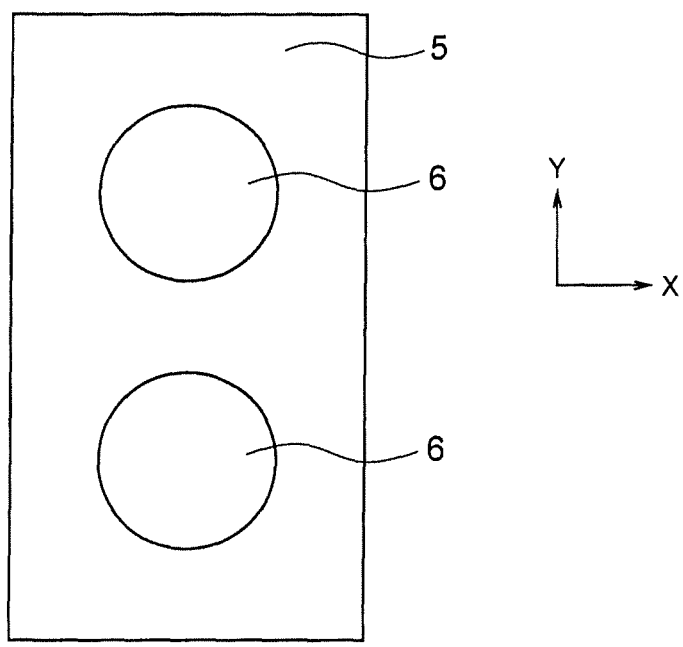
FIG. 3 is a plan view illustrating an example of a photomask in some embodiments.

FIG. 3 is a plan view illustrating an example of a photomask 5 in some embodiments.

The photomask 5 is used for patterning the afore-mentioned resist layer. In some embodiments, the photomask 5 has an opening pattern 6 for forming an opening in the resist layer. In step S1 (see FIG. 1), for example, two-dimensional data indicating a layout of the opening pattern 6 of the photomask 5 is input.

Next, the topography of the material in the calculation region (e.g., calculation space) of the topography simulation is calculated based on the input two-dimensional data (steps S2A, S2B and S2C in FIG. 1). In some embodiments, the topography of the material in the calculation region after 0 second, 100 seconds, and 200 seconds elapse from the start of the process of the first layer 2 to be processed is calculated, respectively. Next, level set functions (see FIG. 5) after 0 second, after 100 seconds, and after 200 seconds are generated from the topographies of the material at the times after 0 second, 100 seconds, and 200 seconds elapse (step S3A, S3B and S3C in FIG. 1). In some embodiments, a topography setting unit is configured to perform the process of steps S2A to S3A, steps S2B to S3B and steps S2C to S3C. Further, the times corresponding to after 0 second, after 100 seconds, and after 200 seconds are examples of the N times $T_1$ to $T_N$ (N is an integer of 2 or more).

In some embodiments, a simulation process is performed after patterning the resist layer using the photomask 5, and etching the second layer 3 to be processed using the resist layer as a mask. In this process, in some embodiments, the first layer 2 to be processed is etched by using the second layer 3 to be processed as a mask.

Figures 4A, 4B, 4C:
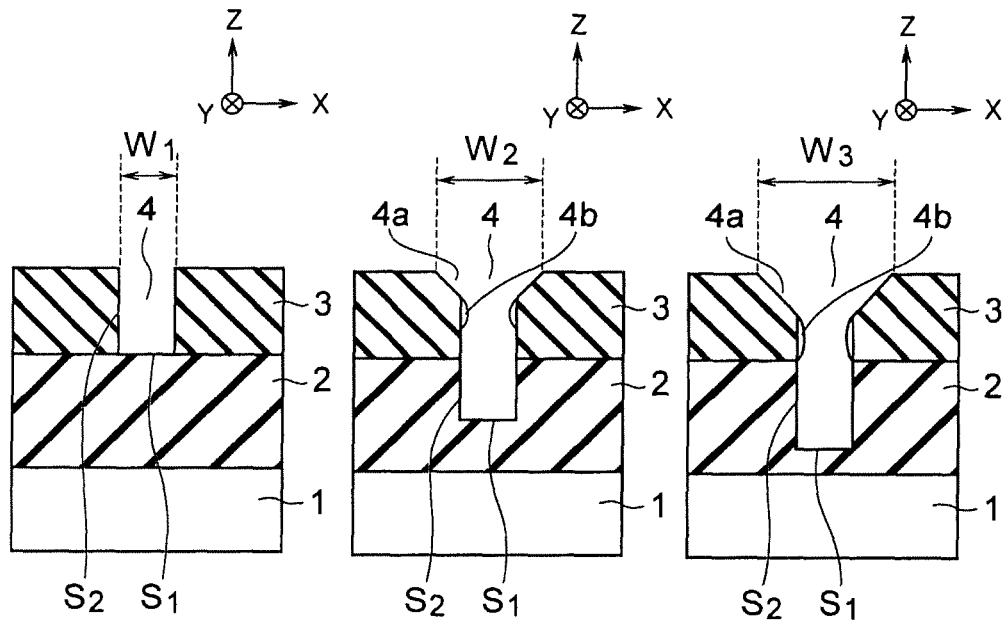
FIG. 4A, FIG. 4B and FIG. 4C are cross-sectional views illustrating an example of a topography of the material in steps S2A to S2C of FIG. 1.

FIG. 4A, FIG. 4B and FIG. 4C are cross-sectional views illustrating an example of the topography of the material in steps S2A, S2B and S2C in FIG. 1, respectively.

FIG. 4A represents the topography of the material after 0 second. In FIG. 4A, an opening 4 having an opening width W1 is formed in the second layer 3 to be processed. A reference symbol S1 indicates the bottom surface of the opening 4. A reference symbol S2 indicates a side surface of the opening 4. The topography illustrated in FIG. 4A is the same as the initial structure illustrated in FIG. 2.

FIG. 4B represents the topography of the material after 100 seconds. In FIG. 4B, an opening 4 having an opening width W2 is formed in the first and second layers to be processed 2 and 3. FIG. 4B further represents a scraping portion 4a in which the second layer 3 to be processed in the vicinity of the upper end of the opening 4 is cut, and an extraneous matter 4b attached to the side surface S2 of the opening 4. In some embodiments, since the first layer 2 to be processed is thick (e.g., thicker than the substrate 1 and the second layer 3 to be processed), the scraping portion 4a and the extraneous matter 4b are generated during the etching of the first layer 2 to be processed. In some embodiments, since the scraping portion 4a is generated, the opening width W2 is wider than the opening width W1.

FIG. 4C represents the topography of the material after 200 seconds. In FIG. 4C, an opening 4 having an opening width W3 is formed in the first and second layers to be processed 2 and 3. As the etching of the first layer 2 to be processed progresses, the scraping portion 4a and the extraneous matter 4B in FIG. 4C become larger compared to the scraping portion 4a and the extraneous matter 4b in FIG. 4B. In some embodiments, since the scraping portion 4a is increased, the opening width W3 is wider than the opening width W2.

In some embodiments, if the above two-dimensional data indicates the layout of the opening pattern 6 of the photomask 5, the approximate progress of the etching of the first layer 2 to be processed is predictable from the experimental result obtained when actually using the photomask 5. Therefore, in some embodiments, in steps S2A, S2B and S2C, an approximate change of the topography of the material is predicted from the two-dimensional data, and the respective topographies of the material after 0 second, 100 seconds, and 200 seconds are calculated. Then, thereafter, in some embodiments, a fine change in the topography of the material is predicted, based on the respective topographies of the material after 0 second, 100 seconds, and 200 seconds.

For example, in steps S2A, S2B and S2C of some embodiments, an equation that represents an approximate change of the topography of the material is derived from the two-dimensional data, and the respective topographies of the material after 0 second, 100 seconds, and 200 seconds may be calculated based on this equation. In some embodiments, the equation represents a height from the bottom surface of the second layer 3 to be processed to a lower end of the scraping portion 4a. In some embodiments, the equation represents an amount of deviation from a boundary surface in the two-dimensional data. In some embodiments, when expressing the height (e.g., the height from the bottom surface of the second layer 3 to be processed to the lower end of the scraping portion 4a) as $\Delta H$, the amount of deviation as $\Delta W$ (e.g., an amount of deviation from a boundary surface in the two-dimensional data), and a time from the start of processing the first layer 2 as T, the height $\Delta H$ is given by, for example, an equation $\Delta H = -aT + b$, and the amount of deviation $\Delta W$ is given by, for example, an equation $\Delta W = cT$ (a, b, and c are positive integers). In this case, the height $\Delta H$ decreases with the time T, and the amount of deviation $\Delta W$ increases with the time T. With these equations, the height $\Delta H$ and the amount of deviation $\Delta W$ after 0 second, 100 seconds, and 200 seconds can be calculated by substituting T=0, 100, 200 to these equations.

In some embodiments, the functional form of the height $\Delta H$ and the amount of deviation $\Delta W$ may be a functional form other than a linear function of time T. Examples of such functional form include a quadratic function of time T, an exponential function, a logarithmic function, and a combination of these functions.

In some embodiments, the height $\Delta H$ may be expressed as a function of the amount of deviation $\Delta W$. For example, when $\Delta W > -0.02$, it may be set that $\Delta H = k\Delta W + eT + f$, and when $\Delta W < -0.02$, it may be set that $\Delta H = gT + h$ (k, e, f, g, and h are integers). In some embodiments, it is specified that the amount of deviation $\Delta W$ is positive in a region where a material is present as viewed from the boundary surface, and it is negative in a region where a material is not present as viewed from the boundary surface. In some embodiments, the amount of deviation $\Delta W$ corresponds to a distance between the boundary surface in the two-dimensional data and the boundary surface of the material over time T.

Figure 5:
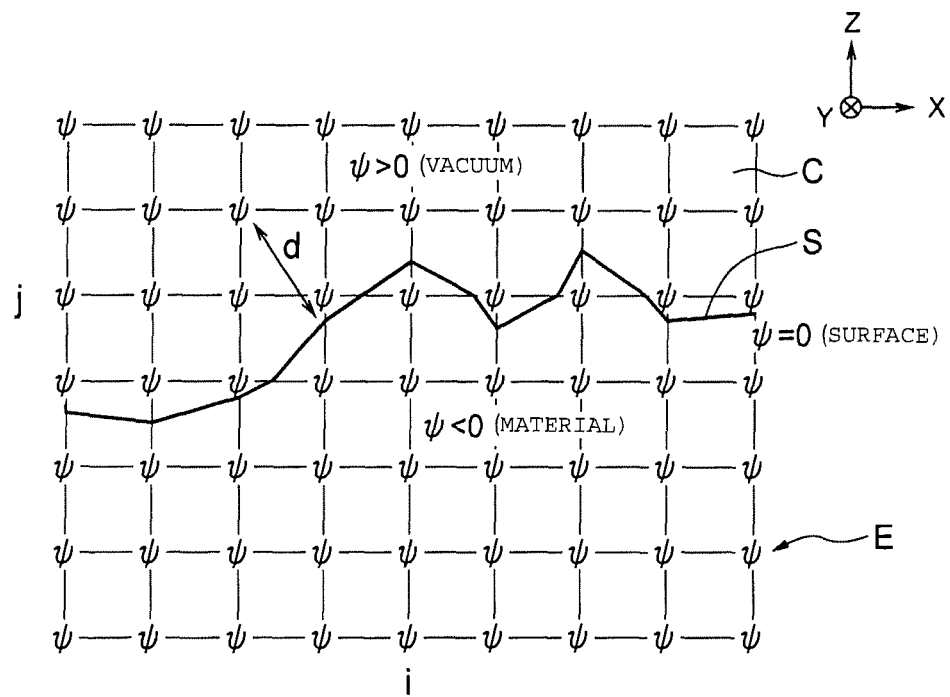
FIG. 5 is a schematic diagram illustrating a level set function.

FIG. 5 is a schematic diagram illustrating a level set function $\psi$.

In FIG. 5, the level set function $\psi$ is illustrated in a calculation region (e.g., calculation space) of topography simulation. The calculation region illustrated in FIG. 5 includes a plurality of cells (e.g., meshes) C which are obtained by dividing the calculation region, and a plurality of lattice points (e.g., mesh points) E which are the vertices of these cells C. A reference symbol S indicates the surface of the material in the calculation region.

The level set function $\psi$ is a function indicating a positional relationship between the lattice point E and the material surface S. In some embodiments, the level set function $\psi$ is specified by a distance d between the lattice point E and the material surface S, and has a value for each lattice point (e.g., $\psi(E)$). In some embodiments, the value of the level set function $\psi$ is specified as 0 for the material surface S (e.g., $\psi = 0$). In some embodiments, it is established that $\psi > 0$ in the exterior of the material (e.g., in the vacuum) and $\psi < 0$ in the interior of the material (e.g., within the material). In some embodiments, when generating the level set function $\psi$, the position of the material surface S which is the closest to each lattice point is found, and the distance d between the lattice point and the found position is calculated. In some embodiments, if the lattice point is in the vacuum, the reference symbol of the level set function $\psi$ at the lattice point is set to a positive value. In some embodiments, if the lattice point is in the material, the reference symbol of the level set function $\psi$ at the lattice point is set to a negative value.

In some embodiments, in step S3A, the level set function $\psi$ after 0 second is generated from the topography illustrated in FIG. 4A. Similarly, in step S3B, the level set function $\psi$ after 100 seconds is generated from the topography illustrated in FIG. 4B, and in step S3C, the level set function is after 200 seconds is generated from the topography illustrated in FIG. 4C.

Next, in some embodiments, in step S4A, the local surface movement speed F of the material (after 0 second) is calculated based on the level set function generated in step S3A. Similarly, in step S4B, the local surface movement speed F of the material (after 100 second) is calculated based on the level set function generated in step S3B, and in step S4C, the local surface movement speed F of the material (after 200 second) is calculated based on the level set function generated in step S3C. The movement of the surface of the material may be caused by, for example, the formation a film on the surface of the material. Examples of the formation include deposition, oxidation, nitridation, epitaxial growth, and the like. The movement of the surface of the material may also be caused by, for example, the removal of the material from the surface of the material. Examples of the removal include etching, ashing, and the like. In some embodiments, in order to simulate the etching of the first layer 2 to be processed, the surface movement speed F at the bottom surface $S_1$ of the opening 4 corresponds to the etching rate.

In some embodiments, the calculation of the surface movement speed F is not performed for each time step. In some embodiments, the surface movement speed F is calculated based on the flux of the surface of the material (e.g., total flux) and the level set function is calculated based on the surface movement speed F. In some embodiments, the level set function is calculated based on the flux, and the calculation of the surface movement speed F may be omitted.

Next, in some embodiments, in step S5A, the level set function after a lapse of time Δt is calculated using the surface movement speed F calculated in step S4A, thereby calculating the level set function after 0+Δt seconds in step S5A. Similarly, in step S5B, the level set function after a lapse of time Δt is calculated using the surface movement speed F calculated in step S4B, thereby calculating the level set function after 100+Δt seconds in step S5B. Similarly, in step SSC, the level set function after a lapse of time Δt is calculated using the surface movement speed F calculated in step S4C, thereby calculating the level set function after 200+Δt seconds in step S5C. In some embodiments, a level set function ψ at time t can be calculated based on the following equation (1).

$$\psi_t + F|\nabla \psi| = 0 \qquad (1)$$

Here, $\nabla$ represents a vector differential operator, $|\nabla \psi|$ represents the norm of $\nabla \psi$, and $\psi_t$ represents the time partial differential of $\psi$. The level set function after a lapse of time Δt can be calculated by developing the level set function over time, according to the equation obtained by discretizing Equation (1). The time Δt represents a time step for performing time development calculation of the level set function.

Then, in some embodiments, after the execution of step S5A, it is determined whether or not a process time which is set in advance elapses (step S6A). Similarly, after the execution of step S5B, it is determined whether or not a process time which is set in advance elapses (step S6B), and after the execution of step SSC, it is determined whether or not a process time which is set in advance elapses (step S6C). In some embodiments, the process time set in advance is 100 seconds. For example, in step S6A, after 100 seconds elapse from the processing start of the first layer 2 to be processed, the process proceeds to step S7A. In some embodiments, for example in step S6B, after 200 seconds elapse from the processing start of the first layer 2 to be processed, the process proceeds to step S7B. In some embodiments, for example in step S6C, after 300 seconds elapse from the processing start of the first layer 2 to be processed, the process proceeds to step S7C. In some embodiments, if a process time does not elapse in step S6A, the process returns to step S4A. Similarly, if a process time does not elapse in step S6B, the process returns to step S4B, and if a process time does not elapse in step S6C, the process returns to step S4C.

Then, after the execution of step S6A, the local surface movement amount of a material is calculated (step S7A). Similarly, after the execution of step S6B, the local surface movement amount of a material is calculated (step S7B), and after the execution of step S6C, the local surface movement amount of a material is calculated (step S7C).

Figure 6:
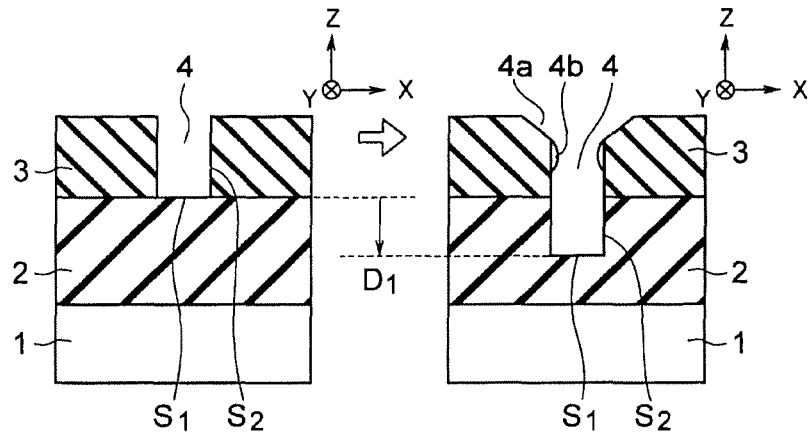
FIG. 6 is a cross-sectional view illustrating an example of a surface movement amount in step S7A in FIG. 1.

FIG. 6 is a cross-sectional view illustrating an example of a surface movement amount $D_1$ in step S7A in FIG. 1. In some embodiments, in step S7A (see FIG. 1), the surface movement amount $D_1$ in the material is calculated based on the time after 0 second to the time after 100 seconds. The surface movement amount $D_1$ in FIG. 6 represents a distance that the bottom surface $S_1$ of the opening 4 moves from the time after 0 second to the time after 100 seconds. In some embodiments, the surface movement amount $D_1$ is calculated using, for example, the surface movement speed which is repeatedly calculated in step S4A or the level set function which is repeatedly calculated in step S5A. In some embodiments, the surface movement amount $D_1$ in FIG. 6 can be calculated by using the surface movement speed F (e.g., etching rate) of the bottom surface $S_1$ of the opening 4.

Figure 7:
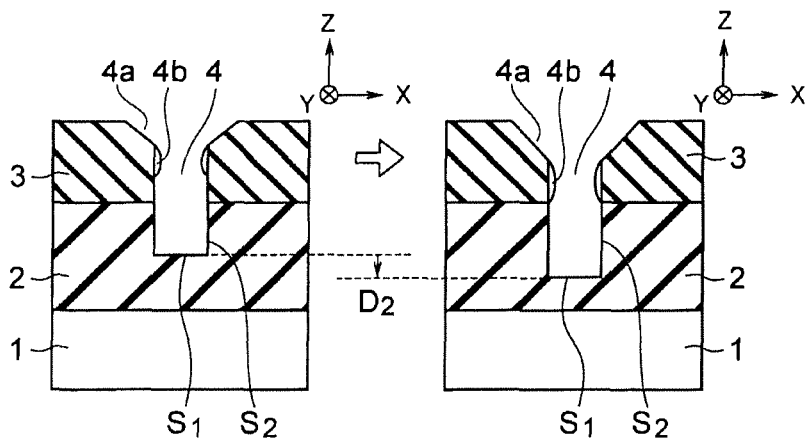
FIG. 7 is a cross-sectional view illustrating an example of a surface movement amount in step S7B in FIG. 1.

FIG. 7 is a cross-sectional view illustrating an example of a surface movement amount $D_2$ in step S7B in FIG. 1. In some embodiments, in step S7B, the surface movement amount $D_2$ of the material from the time after 100 seconds to the time after 200 seconds is calculated. The surface movement amount $D_2$ in FIG. 7 represents a distance that the bottom surface $S_1$ of the opening 4 moves from the time after 100 seconds to the time after 200 seconds. In some embodiments, the surface movement amount $D_2$ is calculated using, for example, the surface movement speed which is repeatedly calculated in step S4B or the level set function which is repeatedly calculated in step S5B. In some embodiments, the surface movement amount $D_2$ in FIG. 7 can be calculated by using the surface movement speed F (etching rate) of the bottom surface $S_1$ of the opening 4.

Figure 8:
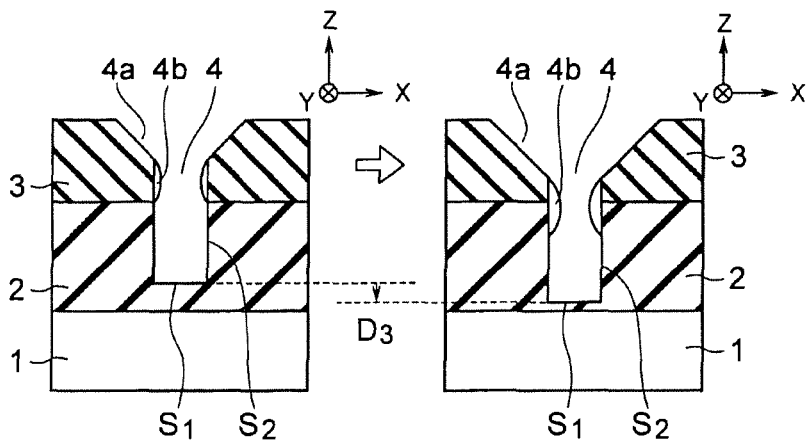
FIG. 8 is a cross-sectional view illustrating an example of a surface movement amount in step S7C in FIG. 1.

FIG. 8 is a cross-sectional view illustrating an example of the surface movement amount $D_3$ in step S7C in FIG. 1. In some embodiments, in step S7C, the surface movement amount $D_3$ of the material from the time after 200 seconds to the time after 300 seconds is calculated. The surface movement amount $D_3$ in FIG. 8 represents a distance that the bottom surface $S_1$ of the opening 4 moves from the time after 200 seconds to the time after 300 seconds. In some embodiments, the surface movement amount $D_3$ is calculated using, for example, the surface movement speed which is repeatedly calculated in step S4C or the level set function which is repeatedly calculated in step S5C. In some embodiments, the surface movement amount $D_3$ in FIG. 8 can be calculated by using the surface movement speed F (etching rate) of the bottom surface $S_1$ of the opening 4.

In some embodiments, the surface movement amounts $D_1$ to $D_3$ are calculated at a plurality of locations of the material. For example, in FIG. 6 to FIG. 8, the surface movement amounts $D_1$ to $D_3$ can be calculated at a plurality of locations of the bottom surface $S_1$ of the opening 4. As a result, the spatial distribution of the surface movement amounts $D_1$ to $D_3$ can be obtained. In some embodiments, from this spatial distribution, it is possible to obtain information such as that the surface movement amount $D_1$ is large in some places and the surface movement amount $D_1$ is small in other places.

In some embodiments, in steps S4A to S7C, the respective topographies of the material after 0 second, 100 seconds, and 200 seconds are independently developed overtime. In other words, the process of steps S4A, S5A, S6A, and S7A, the process of steps S4B, S5B, S6B, and S7B, and the process of steps S4C, S5C, S6C, and S7C are progressed independently from each other. Thus, a surface movement amount $D_1$ that represents a change of the topography of the material from a time after 0 second to a time after 100 seconds, a surface movement amount $D_2$ that represents a change of the topography of the material from a time after 100 seconds to a time after 200 seconds, and a surface movement amount $D_3$ that represents a change of the topography of the material from a time after 200 seconds to a time after 300 seconds are calculated. In some embodiments, a time development calculation unit is configured to perform the process of steps S4A to S7C. In some embodiments, the respective times corresponding to after 100 seconds, after 200 seconds, and after 300 seconds are examples of the N times $T_1'$ to $T_N'$ (N is an integer of 2 or more). In some embodiments, the surface movement amounts $D_1$ to $D_3$ are examples of the first to N-th values.

Next, in some embodiments, the total value D of the local surface movement amounts $D_1$ to $D_3$ of a material is calculated (step S8 in FIG. 1). The total value D is represented by $D_1+D_2+D_3$. The total value D in some embodiments is calculated at a plurality of locations of the material. Since the etching of the first layer 2 to be processed is simulated in some embodiments, the total value D at the bottom surface $S_1$ of the opening 4 corresponds to the amount of etching. Then, in some embodiments, the final topography of the material is calculated based on the total value D, and the two-dimensional data that represents the final topography of the material is output from the information processing apparatus (step S9). In some embodiments, the final topography of the material can be output by the information processing apparatus displaying the data on a screen, storing the data in a memory, or transmitting the data to another computer or work station, thereby completing the topography simulation. In some embodiments, a topography calculation unit is configured to perform the process of steps S8 and S9.

In some embodiments, the final topography of the material is the topography of the material after 300 seconds elapse from the processing start of the first layer 2 to be processed. The time corresponding to after 300 seconds is an example of a time TN+1. Thus, in some embodiments, times T1' to TN' (times after 100 seconds, 200 seconds, and 300 seconds) respectively match times T2 to TN+1 (times after 100 seconds, 200 seconds, and 300 seconds). In some embodiments, the value of N may be set to a value other than 3.

Incidentally, in some embodiments, although a level set method is used as a technique of representing a topography, a technique such as a string method other than the level set method may be used.

Figure 9A:
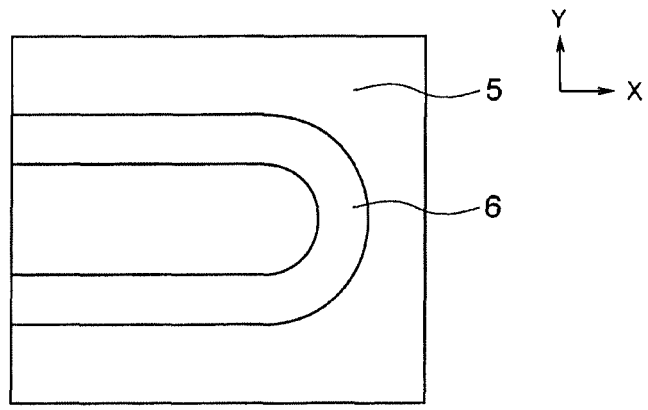
FIG. 9A and FIG. 9B are plan views illustrating steps S8 and S9 in FIG. 1.
Figure 9B:
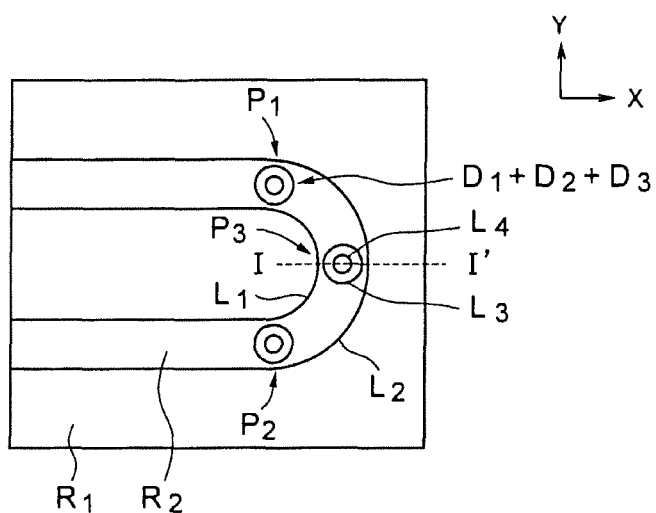
Figure 9C:
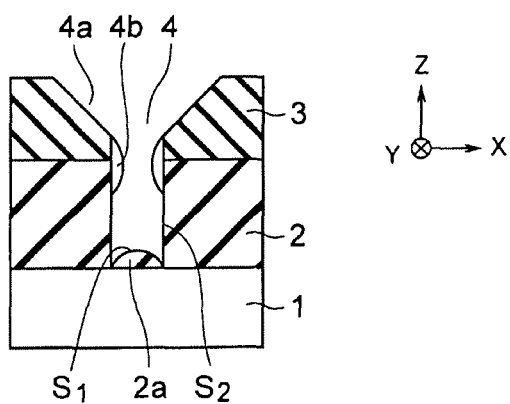
FIG. 9C is a cross-sectional view thereof.

FIG. 9A and FIG. 9B are plan views illustrating steps S8 and S9 in FIG. 1, and FIG. 9C is a cross-sectional view thereof.

FIG. 9A is a plan view illustrating an example of the photomask 5. In some embodiments, the photomask 5 includes a U-shaped opening pattern 6. In some embodiments, the two-dimensional data of step S1 represents the photomask 5, and the U-shaped opening 4 is formed on the first layer 2 to be processed, in the final topography of the material of step S9.

FIG. 9B illustrates an example of the two-dimensional data of step S9 when the two-dimensional data of step S1 represents the photomask 5. FIG. 9B illustrates two-dimensional data in which the final topography (e.g., a three-dimensional topography) of the material is represented by contour lines. FIG. 9B illustrates an external region $R_1$ of the opening 4, an internal region $R_2$ of the opening 4, contour lines $L_1$ and $L_2$ corresponding to the side surface $S_2$ of the opening 4, and contour lines $L_3$ and $L_4$ corresponding to the unevenness of the bottom surface $S_1$ of the opening 4. In FIG. 9B, convex portions are formed on the regions indicated by $P_1$, $P_2$ and $P_3$.

FIG. 9C is a cross-section view illustrating the topography of the material taken along I-I' line in FIG. 9B. FIG. 9C depicts the residue 2a remaining in the opening 4. In some embodiments, because the residue 2a remains in the regions $P_1$, $P_2$ and $P_3$, the opening 4 does not pass through the first layer 2 to be processed at the positions of the regions $P_1$, $P_2$ and $P_3$. The residue 2a is indicated by the contour lines $L_3$ and $L_4$ in FIG. 9B. The contour lines $L_3$ and $L_4$ can be made using the total value D of the surface movement amounts $D_1$, $D_2$ and $D_3$ (e.g., $D=D_1+D_2+D_3$).

In some embodiments, the topography of the material after 0 second is not developed over time up to the time after 300 seconds, the topographies of the material after 0 second, 100 seconds, and 200 seconds are developed over time up to the times after 100 seconds, 200 seconds, and 300 seconds. In other words, in some embodiments, a time development calculation for 300 seconds is divided into three flows of time development calculations, each for 100 seconds, and three flows of time development calculations are performed independently from each other. In some embodiments, the final topography of the material is calculated by integrating the surface movement amounts $D_1$ to $D_3$ obtained by three flows of time development calculations.

Therefore, according to some embodiments, as compared with the case of performing the time development calculations for 300 seconds without division, it is possible to simplify the topography simulation. Further, according to some embodiments, since the simplification can be achieved without replacing three-dimensional simulation into two-dimensional simulation, it is possible to enhance the accuracy of the final topography of the material, and improve the accuracy of the topography simulation.

In some embodiments, it is possible to reduce the calculation time of topography simulation by performing all or a part of three flows of time development calculations in parallel. In some embodiments, all or a part of the process of steps S2A, S3A, . . . , and S7A, the process of steps S2B, S3B, . . . , and S7B, and the process of steps S2C, S3C, and S7C may be performed in parallel.

Furthermore, according to some embodiments, it is possible to further shorten the calculation time of the topography simulation, by increasing the time step Δt that is specified by Courant Friedrichs Lewy (CFL) condition.

In some embodiments, the topography of the material after 100 seconds obtained in the step S7A can be different from the topography of the material after 100 seconds given in step S2B in general. In some embodiments, the topography of the material after 200 seconds obtained in the step S7B can be different from the topography of the material after 200 seconds given in step S2C in general. In some embodiments, if the difference between these topographies is sufficiently small (e.g., less than a predetermined threshold value), the result of the topography simulation of some embodiments can be used as a reasonable result. For example, it is possible to reduce the difference in these topographies by increasing the accuracy of predicting the topography of the material in steps S2A to S2C.

Figure 10:
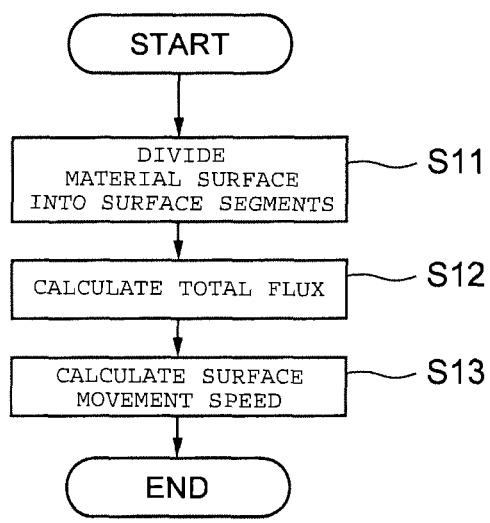
FIG. 10 is a flow chart illustrating the details of steps S4A to S4C in FIG. 1.

FIG. 10 is a flow chart illustrating the details of steps S4A, S4B and S4C of FIG. 1. In some embodiments, each of steps S4A, S4B and S4C is performed as FIG. 10. Below, the flowchart of FIG. 10 will be described with reference to FIG. 11.

First, in some embodiments, the material surface S, which is represented by the level set function, is divided into a plurality of surface segments (step S11). In some embodiments, a division unit is configured to perform the process of step S11.

Figure 11:
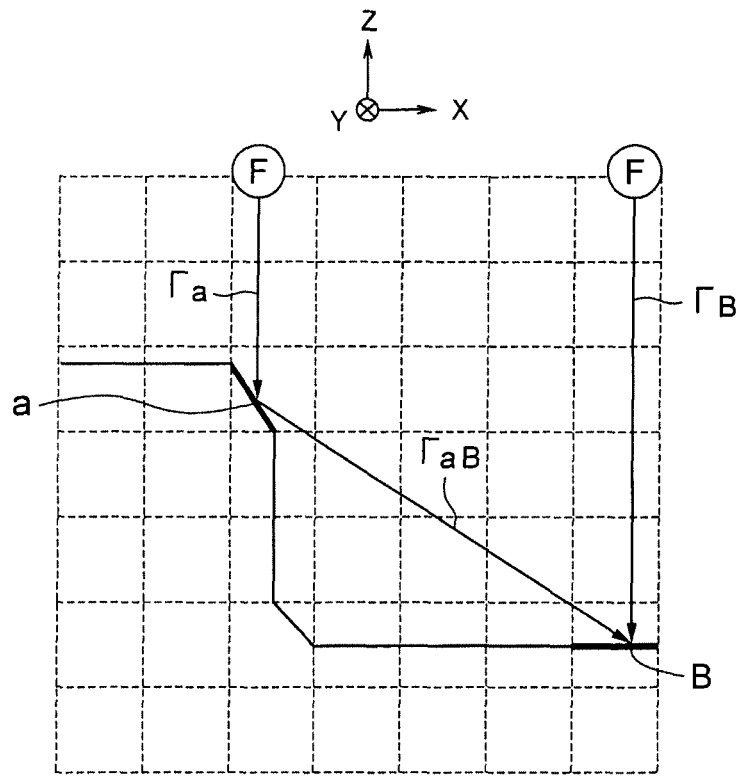
FIG. 11 is a schematic diagram illustrating a state in which the material surface is divided into a plurality of surface segments.

FIG. 11 is a schematic diagram illustrating a state in which the material surface S is divided into a plurality of surface segments.

In FIG. 11, the material surface S is divided for each cell C (see also FIG. 5), so that the material surface S in a single cell C is a single surface segment. Reference symbols a and B indicate examples of the surface segment.

In some embodiments, when calculating the flux of a particle (e.g., reactive species) reaching the surface segment B, the flux $\Gamma_B$ of a particle that directly reaches the surface segment B from a gas layer, and the flux $\Gamma_{aB}$ of a particle that indirectly reaches the surface segment B from a gas layer through another surface segment a (at which a direct flux $\Gamma_a$ can be specified) are considered. For example, the flux of a particle can be calculated based on the flux $\Gamma_B$ and flux $\Gamma_{aB}$ of the particle. The flux $\Gamma_B$ is referred to as a direct flux, and the flux $\Gamma_{aB}$ is referred to as an indirect flux. In addition, a total of flux $\Gamma_B$ and $\Gamma_{aB}$ is referred to as a total flux.

Next, in some embodiments, the total flux of the respective surface segments is calculated (step S12). Then, in some embodiments, the surface movement speed of each surface segment is calculated using the total flux of the respective surface segments (step S13). In some embodiments, the surface movement speed of each surface segment corresponds to the local surface movement speed F of the material. In some embodiments, a first calculation unit is configured to perform the process of steps S12 and S13 (see FIG. 10).

Thereafter, in some embodiments, the level set function is calculated based on the surface movement speed in steps S5A, S5B and S5C, and the surface movement amount is calculated based on the surface movement speed or the level set function in steps S7A, S7B and S7C. In some embodiments, during these calculations, a total flux is used instead of the surface movement speed. In some embodiments, during these calculations, the calculation of the surface movement speed may be omitted. In some embodiments, a second calculation unit is configured to perform the process of steps S5A to S7C.

As described above, in some embodiments, the topographies of the material at a plurality of times can be independently developed over time, and a plurality of surface movement amounts each representing a change in the topography of the material from theses times can be calculated and integrated so as to calculate the final topography of a material. Therefore, according to some embodiments, it is possible to simplify the topography simulation and also improve the accuracy thereof.

Figure 12:
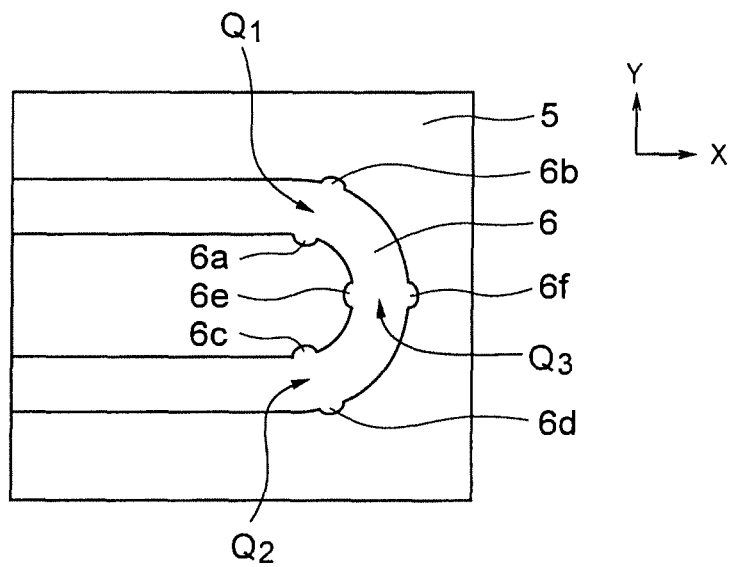
FIG. 12 is a plan view illustrating a topography simulation method according to some embodiments.

FIG. 12 is a plan view illustrating a topography simulation method according to some embodiments.

FIG. 12 illustrates an example of the photomask 5, similar to FIG. 9A. FIG. 12 further illustrates regions Q1, Q2, and Q3 corresponding to the regions $P_1$, $P_2$ and $P_3$ in FIG. 93.

In some embodiments (e.g., those illustrated in FIGS. 1-11), the residue 2a may remain in the regions $P_1$ to $P_3$. In some embodiments, in order to prevent the residue 2a from remaining in the regions $P_1$, $P_2$ and $P_3$, optical proximity correction (OPC) may be applied to the photomask 5. In some embodiments, referring to FIG. 12, corrected opening patterns 6a, 6b, 6c, 6d, 6e, and 6f are provided in the vicinity of the regions $Q_1$, $Q_2$, and $Q_3$ of the opening pattern 6. In some embodiments, the process of steps S2A to S9 is performed again by using two-dimensional data that represents the photomask 5.

Figure 13:
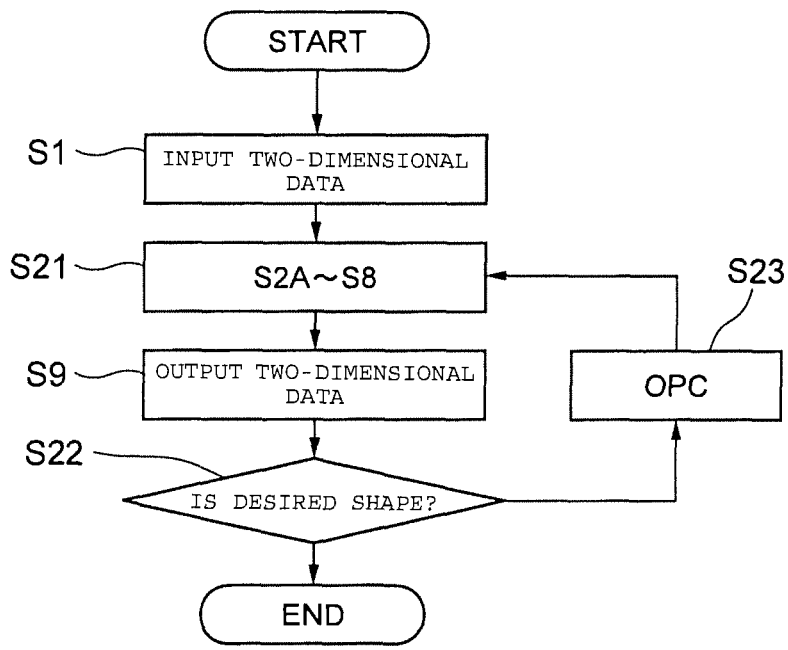
FIG. 13 is a flowchart illustrating a topography simulation method according to some embodiments.

FIG. 13 is a flow chart illustrating a topography simulation method according to some embodiments.

First, in some embodiments, the two-dimensional data that represents the photomask 5 in FIG. 9A is input to the information processing apparatus (step S1). Next, in some embodiments, the process of steps S2A to 8 is performed by using the two-dimensional data (step S21). Then, in some embodiments, the final topography of the material is derived from the two-dimensional data, and the two-dimensional data that represents the final topography of the material is output from the information processing apparatus (step S9).

Next, in some embodiments, it is checked whether or not the final topography of the material is a desired topography (step S22). For example, it is checked whether or not the residue 2a remains on the bottom surface $S_1$ of the opening 4. This checking may be performed automatically by the information processing apparatus, or may be performed by the user of the information processing apparatus. In the latter case, the user may input the check result to the information processing apparatus.

In some embodiments, if the final topography of the material is a desired topography, the topography simulation of some embodiments is completed. In some embodiments, if the final topography of the material is not a desired topography, the two-dimensional data that represent the photomask 5 is corrected by OPC (step S23). As a result, the two-dimensional data can be corrected to represent the photomask 5 in FIG. 12. This correction may be performed automatically by the information processing apparatus, or may be performed by the user of the information processing apparatus. In the latter case, the user may perform the correction on the screen of the information processing apparatus.

Next, in some embodiments, the process of steps S2A to 8 is performed by using the corrected two-dimensional data (step S21). For example, in steps S2A to S3C, the topography and the level set function of the material are corrected based on the two-dimensional data. As a result, the surface movement amounts $D_1$ to $D_3$ can be corrected in steps S4A to S7C, and the total value D of the surface movement amounts $D_1$ to $D_3$ can be corrected in step S8. Next, in some embodiments, the final topography of the material is derived from the corrected two-dimensional data, and the two-dimensional data that represents the final topography of the material is output from the information processing apparatus (step S9). In other words, the corrected final topography of the material is output.

In some embodiments, the above process is repeated until the final topography of the material becomes a desired topography (step S22), thereby completing the topography simulation.

As described above, in some embodiments, the two-dimensional data of step S1 may be corrected based on the final topography of the step S9, and the topography simulation may be performed again using the corrected two-dimensional data. Therefore, according to some embodiments, it is possible to achieve a condition for obtaining a desired simulation result, by a feedback calculation.

Figure 14:
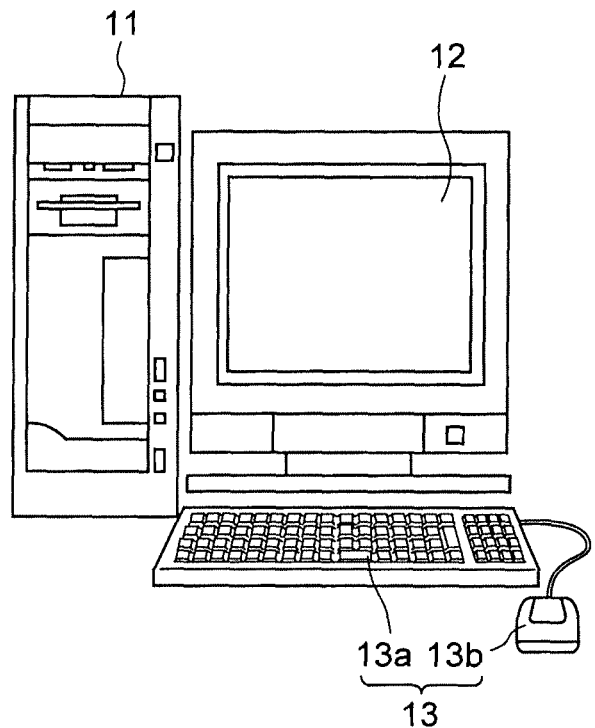
FIG. 14 is an external view illustrating the configuration of a topography simulation apparatus according to some embodiments.

FIG. 14 is an external view illustrating the configuration of a topography simulation apparatus of some embodiments.

The topography simulation apparatus in FIG. 14 includes a control unit 11, a display unit 12, and an input unit 13.

In some embodiments, the control unit 11 is a device that controls the operation of the topography simulation apparatus. The control unit 11 may perform, for example, the topography simulation method according to some embodiments (e.g., the embodiments illustrated in FIGS. 1-13).

In some embodiments, the display unit 12 is provided with a display device such as a liquid crystal monitor. For example, the display unit 12 displays an input screen of the setting information of topography simulation, and an output screen of a calculation result of the topography simulation.

The input unit 13 may be provided with an input device such as a keyboard 13a and a mouse 13b. For example, the input unit 13 is used for input of the setting information of the topography simulation.

Figure 15:
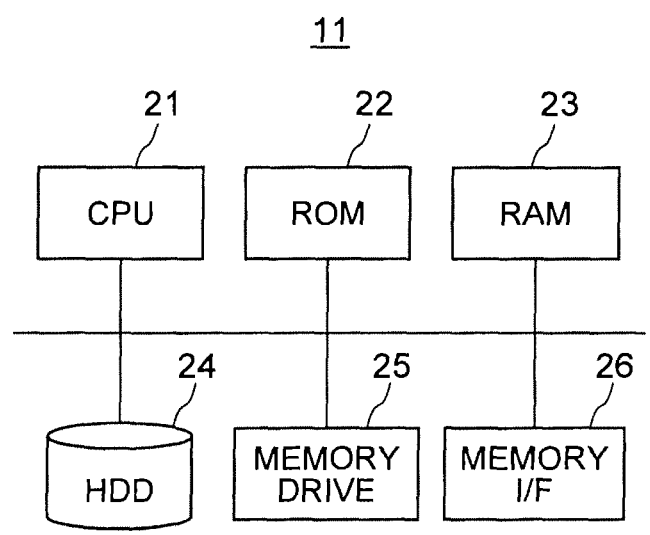
FIG. 15 is a block diagram illustrating the configuration of a control unit in FIG. 14.

FIG. 15 is a block diagram illustrating the configuration of the control unit 11 in FIG. 14.

The control unit 11 includes a central processing unit (CPU) 21, a read only memory (ROM) 22, a random access memory (RAM) 23, a hard disk drive (HDD) 24, a memory drive 25 such as a compact disc (CD) drive and a digital versatile disk (DVD) drive, and a memory interface (I/F) 26 such as a memory port and a memory slot.

In some embodiments, a topography simulation program for executing the topography simulation method according some embodiments (e.g., embodiments illustrated in FIGS. 1-13) is stored in the ROM 22 or the HDD 24. In some embodiments, when a predetermined instruction is input from the input unit 13, the CPU 21 reads the topography simulation program from the ROM 22 or the HDD 24, develops the read program to the RAM 23, and performs topography simulation by using this program. Various pieces of data generated during the process are stored in the RAM 23.

In some embodiments, a computer-readable recording medium which non-temporarily records the topography simulation program is prepared, and the topography simulation program may be installed in the ROM 22 or the HDD 24 from the recording medium. An example of such a recording medium is a CD-ROM or a DVD-ROM.

In some embodiments, the topography simulation program may be downloaded through a network such as the Internet, and installed in the ROM 22 or the HDD 24.

As described above, according to some embodiments, it is possible to provide a topography simulation apparatus and a topography simulation program for executing the topography simulation methods according to some embodiments (e.g., embodiments illustrated in FIGS. 1-13).

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure. Moreover, some or all of the above-described embodiments can be combined when implemented.

What is claimed is:

1. A topography simulation apparatus comprising a processor and a memory connected to the processor, the memory storing instructions executable by the processor to:
   input two-dimensional data indicating a layout of a pattern into the memory;
   set topographies of a material at N times $T_1$ to $T_N$ within a calculation region, N being an integer of two or more;
   develop the topographies of the material at the times $T_3$ to $T_N$ over time independently, and calculate first to N-th values respectively representing a change in topography of the material from the times $T_1$ to $T_N$ to times $T_1'$ to $T_N'$; and
   calculate a topography of the material at time $T_{N+1}$, based on the first to N-th values,
   wherein the topography of the material at the time $T_i$ (i=2, ... N) is developed before, after, or during the development of the topography of the material at the time $T_{i-1}$.

2. The apparatus according to claim 1,
   wherein the instructions to set the topographies of the material include instructions executable by the processor to set the topographies of the material, based on the two-dimensional data indicating a layout of a pattern of a photomask for processing the material.

3. The apparatus according to claim 2,
   wherein the instructions to set the topographies of the material include instructions executable by the processor to derive an equation that represents a topography of the material as a function over time, by using the two-dimensional data, and set the topographies of the material, by using the equation.

4. The apparatus according to claim 3,
   wherein the equation is a function of a distance between a boundary surface in the two-dimensional data and a boundary surface of the material, over time.

5. The apparatus according to claim 1,
   wherein the instructions to develop the topographies of the material include instructions executable by the processor to develop the topographies of the material at the times $T_1$ to $T_N$ over time in parallel.

6. The apparatus according to claim 1,
   wherein the first to N-th values respectively represent surface movement amounts at a plurality of locations of the material from the times $T_1$ to $T_N$ to times $T_1'$ to $T_N'$.

7. The apparatus according to claim 6,
   wherein the instructions to develop the topographies of the material include instructions executable by the processor to
   divide a surface of the material into a plurality of surface segments,
   calculate at least one of a total flux of particles that directly or indirectly reach each surface segment, or a local surface movement speed of the material, and
   calculate a local surface movement amount of the material, based on the total flux or the local surface movement speed.

8. The apparatus according to claim 1.
   wherein the times $T_1'$ to $T_N'$ respectively match the times $T_2$ to $T_{N+1}$.

9. The apparatus according to claim 1,
   wherein the instructions to calculate the topography of the material include instructions executable by the processor to output two-dimensional data that represents a three-dimensional topography of the material at the time $T_{N+1}$ by contour lines.

10. The apparatus according to claim 1,
    wherein the instructions to calculate the topography of the material include instructions executable by the processor to calculate a total value of the first to N-th values, and calculate the topography of the material at the time $T_{N+1}$ based on the total value.

11. The apparatus according to claim 1,
    wherein the instructions to set the topographies of the material include instructions executable by the processor to correct the topographies of the material at the times $T_1$ to $T_N$, based on the topography of the material at the time $T_{N+1}$,
    wherein the instructions to develop the topographies of the material include instructions executable by the processor to develop the corrected topographies of the material at the times $T_1$ to $T_N$ over time independently, and correct the first to N-th values, and
    wherein the instructions to calculate the topography of the material include instructions executable by the processor to correct the topography of the material at the time $T_{N+1}$, based on the corrected first to N-th values.

12. A non-transitory computer-readable storage medium storing instructions as a topography simulation program executable by a processor to:
    input two-dimensional data indicating a layout of a pattern into a memory;

set topographies of a material at N times $T_1$ to $T_N$ within a calculation region, N being an integer of two or more;

develop the topographies of the material at the times $T_1$ to $T_N$ over time independently, and calculate first to N-th values respectively representing a change in topography of the material from the times $T_1$ to $T_N$ to times $T_1'$ to $T_N'$; and calculate a topography of the material at time $T_{N+1}$, based on the first to N-th values, wherein the topography of material at the time $T_i$ (i=2 . . . N) is developed before, after, or during the development of the topography of the material at the time $T_{i-1}$.

13. The non-transitory computer-readable storage medium according to claim 12, wherein the instructions to set the topographies of the material include instructions executable by the processor to set the topographies of the material, based on the two-dimensional data indicating a layout of a pattern of a photomask for processing the material.

14. The non-transitory computer-readable storage medium according to claim 13, wherein the instructions to set the topographies of the material include instructions executable by the processor to derive an equation that represents a topography of the material as a function over time, by using the two-dimensional data, and set the topographies of the material, by using the equation.

15. The non-transitory computer-readable storage medium according to claim 14, wherein the equation is a function of a distance between a boundary surface in the two-dimensional data and a boundary surface of the material, over time.

16. The non-transitory computer-readable storage medium according to claim 12, wherein the instructions to develop the topographies of the material include instructions executable by the processor to develop the topographies of the material at the times $T_1$ to $T_N$ over time in parallel.

17. A topography simulation method comprising:

inputting two-dimensional data indicating a layout of a pattern into a memory;

setting topographies of a material at N times $T_1$ to $T_N$ within a calculation region, wherein N is an integer of two or more;

developing the topographies of the material at the times $T_1$ to $T_N$ over time independently;

calculating first to N-th surface movement amounts of the material from the times $T_1$ to $T_N$ to times $T_1'$ to $T_N'$, respectively; and calculating a topography of the material at time $T_{N+1}$, based on the first to Nth surface movement amounts, wherein the topography of the material at the time $T_i$ (i=2 , . . . , N) is developed before, after, or during the development of the topography of the material at the time $T_{i-1}$.

18. The method according to claim 17, wherein the first to N-th surface movement amounts respectively represent surface movement amounts at a plurality of locations of the material from the times $T_1$ to $T_N$ to times $T_1'$ to $T_N'$.

19. The method according to claim 18, wherein the developing the topographies of the material includes:

dividing a surface of the material into a plurality of surface segments, calculating at least one of a total flux of particles that directly or indirectly reach each surface segment, or a local surface movement speed of the material, and calculating a local surface movement amount of the material based on the total flux or the local surface movement speed.

20. The method according to claim 19, wherein calculating the local surface movement amount of the material is based on a function of a distance between a boundary surface of the material at time Ta (Ta=0 seconds ) and a boundary surface of the material at time Tb (Tb>0 seconds ).

* * * * *